(No Model.)  2 Sheets—Sheet 1.

J. M. WHITLATCH.
MACHINE FOR PREPARING ROOFING SHEETS.

No. 341,527.  Patented May 11, 1886.

Witnesses.
Jno. K. Smith
H. L. Gill

Inventor.
James M. Whitlatch
by Bakewell & Kerr
his Attorneys (No Model.) 2 Sheets—Sheet 2.
J. M. WHITLATCH.
MACHINE FOR PREPARING ROOFING SHEETS.
No. 341,527. Patented May 11, 1886.
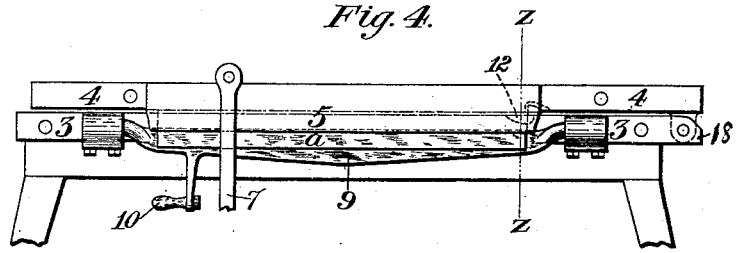
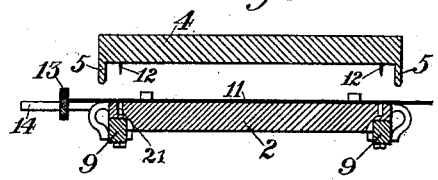
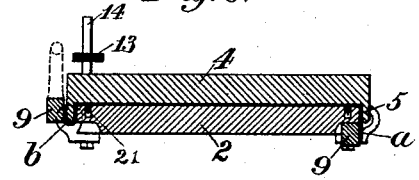
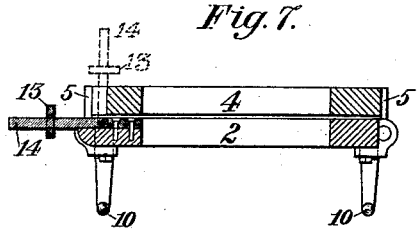
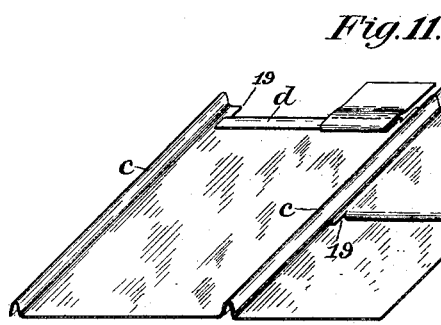
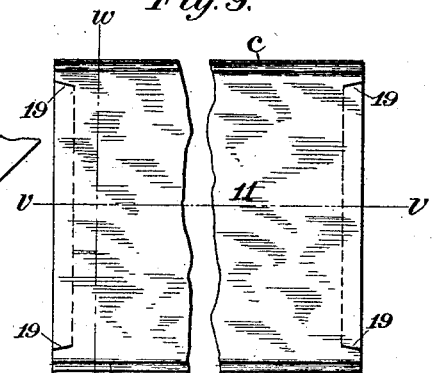
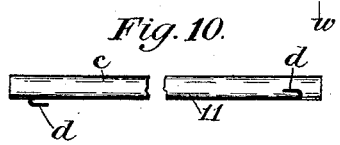
Witnesses.
Jno. K. Smith
N. L. Gill.
Inventor.
James M. Whitlatch
by Bakewell & Kerr
his Attorneys
N. PETERS, Photo-Lithographer, Washington, D. C.

UNITED STATES PATENT OFFICE.

JAMES M. WHITLATCH, OF VERONA, PENNSYLVANIA.

MACHINE FOR PREPARING ROOFING-SHEETS.

SPECIFICATION forming part of Letters Patent No. 341,527, dated May 11, 1886.

Application filed February 1, 1886. Serial No. 190,391. (No model.)

*To all whom it may concern:*

Be it known that I, JAMES M. WHITLATCH, of Verona borough, in the county of Allegheny and State of Pennsylvania, have invented a new and useful Improvement in Machines for Preparing Roofing-Sheets; and I do hereby declare the following to be a full, clear, and exact description thereof, reference being had to the accompanying drawings, forming a part of this specification, in which—

Figure 1:
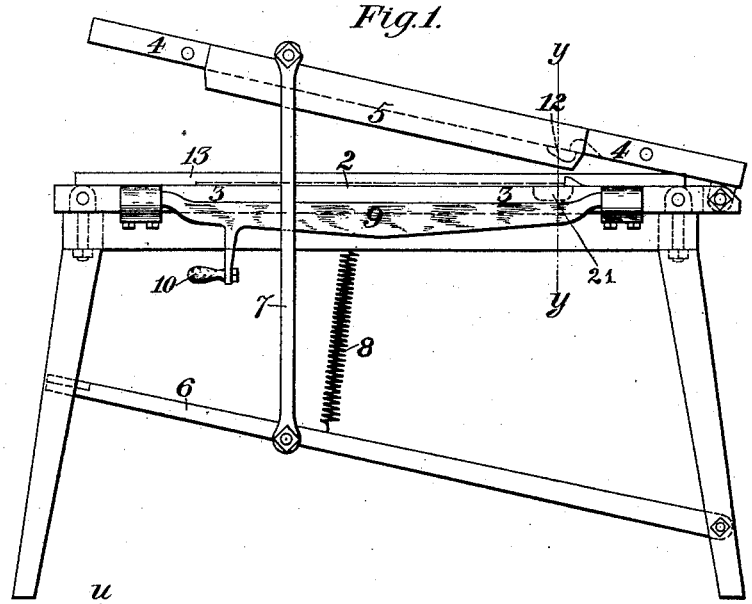
Figure 2:
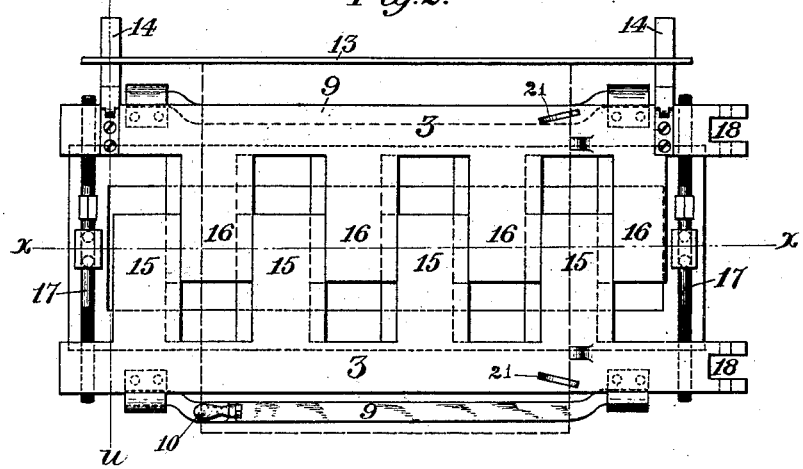
Figure 3:

Figure 1 is a side elevation of my improved machine. Fig. 2 is a plan view of the bed thereof. Fig. 3 is a longitudinal vertical section on the line $x\,x$ of Fig. 2. Fig. 4 is a side view of the upper part of the machine when the hinged frame (marked 4) has been depressed to give the first bend to the roofing-sheet. Fig. 5 is a vertical cross-section on the line $y\,y$ of Fig. 1. Fig. 6 is a similar section on the line $z\,z$ of Fig. 4, illustrating a more advanced stage of the process. Fig. 7 is a vertical cross-section on the line $u\,u$ of Fig. 2. Fig. 8 is a vertical cross-section of the finished roofing-sheet on the line $w\,w$ of Fig. 9, which latter figure is a plan view of the finished sheet. Fig. 10 is a vertical longitudinal section on the line $v\,v$ of Fig. 9. Fig. 11 is a perspective view showing the attachment of the finished sheets together.

Like symbols of reference indicate like parts in each.

The purpose of my invention is to provide an efficient machine for the manufacture of tin roofing-sheets, which are prepared for use by so bending them that they may be readily locked together and kept in position upon the roof. One of the forms of this sheet is illustrated in Figs. 8, 9, and 10 on the second sheet of the drawings, in which 11 represents the body of the sheet, which at its sides is bent into a U form, as at $c$, and at its ends is bent back upon itself, so as to form hooks $d$. The sheets are secured together upon the roof, as shown in Fig. 11, by interlocking the end hooks, $d$, of adjacent sheets in the longitudinal rows, and by causing the open part of the U-shaped lateral flange of one sheet to straddle a similar part of the next adjacent sheet in the same horizontal row, the adjoining sheets in the longitudinal rows being also united by overlapping of the ridges $c$. The sheets are fastened to the roof by cleats which are hooked to the end hooks, $d$, and are nailed to the roof. The sheets themselves are not pierced by the nails, and are therefore water-tight.

The peculiar advantage of this form of roofing, which is known as the "standing-seam" roofing, is that the sheets, while they are quite permanent and stable in their attachment to the roof, are not rigidly joined to each other, as if they were soldered, and hence when acted on by heat or cold the expansion or contraction will be taken up by the bent locking-flanges $c$ and $d$, and the sheets or their joints will not be broken, as often happens with the soldered roofing. These sheets must be bent and formed with great accuracy, so as to secure a good and water-tight roofing, and in this respect prior machines have been so lacking that I have devised the present machine for supplying to the trade what has been a considerable want.

In the drawings, 2 is the bed of the machine upon which the tin rests during the bending operation. At each side of the frame there are rails 3, preferably made horizontal and provided with well-defined rectangular and outer edges which act in bending and shaping the sheets. The width of the bed 2 is made equal to the desired distance between the lateral bends of the sheet, and is preferably adjustable in a manner which I will hereinafter explain. A bending lever or frame, 4, is pivoted to the rear end of the bed 2, and is oscillatory on its pivots, so as to be capable of being raised from the bed, as in Fig. 1, and of being folded down, so as to lie flat thereon, as in Fig. 4. Each of the side rails of the frame 4 has a vertically-projecting blade, 5, which, when the lever-frame is lowered, lies in contact with the outer sides of the side rails of the bed 2. The frame 4 is oscillated by means of any suitable mechanism. I have shown for this purpose a foot-treadle, 6, pivoted to the rear supporting-legs of the machine, and connected with the frame 4 by connecting-rods 7, and with the bed 2 by a spring, 8. The latter spring tends to raise the treadle and normally keeps it and the frame in an elevated position, from which it is lowered by depression of the treadle by the foot of the operator. After the frame has been depressed, and upon the relief of pressure on the treadle 6, the spring 8 will immediately raise the frame into its elevated position. At both sides of the bed 2 there are bending rods or levers 9, which are suitably hinged, so that normally their weight will keep them depending from and out of the way of the blades of the frame 4, but provided with lever-handles 10, by which they may be raised on their hinges until their sides shall be in contact with the outer sides of the blades 5, when the latter are in the position shown in Figs. 4 and 6, and before described.

Thus constructed, the operation is as follows: The sheet of tin 11 is laid upon the bed 2, with its edges projecting beyond each side of the rail 3, the frame 4 having first been allowed to rise to the position shown in Fig. 1. The foot-lever 6 is then depressed, and the frame 4 is pulled down upon the bed 2, when the lips or blades 5, engaging the projecting tin, will bend it down into a right angle against the side rails 3 and against the depending levers 9, as shown at $a$ in Fig. 6. The bending-lever 9, which is preferably coextensive with the tin sheet, is then raised on its hinges until it lies against the outer side of its adjacent lip 5, and in the act of raising the lever it will bend so much of the tin as projects downwardly beyond the edge of the lip up against the latter, as shown at $b$ in Fig. 6, thereby bending the tin into the desired form. (Shown in Figs. 8 and 9.) At the same time with the descent of the frame 4, the knives 12, which are fixed to the under side of the frame, preferably just back of and a little inside of the ends of the bending-lips 5, pierce the tin sheet and cut in it at each end the slits 19. (See Fig. 9.) The dotted lines joining the inner ends of these slits indicate the lines on which the sheet is subsequently bent by a suitable tool to make the opposite upturned-end lips or hooks shown in Fig. 10. After both sides of the sheet have been bent by movement of the lever-handles 10 the work of the machine is finished, the frame 4 is raised, and the sheet may be removed for bending the ends, as before explained.

In order to enable the sheets to be quickly and certainly adjusted upon the bed 2, I provide a gage or stop rail, 13, which is secured at one side of the machine to projecting supports 14, Fig. 2, and is movable and adjustable thereon to and from the side rail of the bed. In the working of the machine the gage is adjusted on its supports at the proper distance from the bed, so that when the tin sheet is put on the machine and placed with its edge in contact with the gage-rail about the same area of metal shall be projecting on each side of the machine. This enables the locking-flanges on each edge of the sheet to be made uniformly, and as the rail is parallel with the side of the bed it affords means for rapidly adjusting the sheet in position. As it appears in the drawings, the gage-rail 13 is in the path of the bending-lever 9 as the latter moves upward to make the first bend of the sheet. This is provided for by hinging the supports 14 at their junction with the side rails of the machine-bed. They will then be folded up and out of the path of the bending-lever when the latter is raised, and when it has fallen they will of their own weight drop to a horizontal position.

As has been noted, the bending of both sides of the tin sheet is done at a single movement of the frame 4. The result of this fact is that whatever be the width of the tin sheet the distance between its lateral locking-flanges, after the bending process, will always be the same, and the flanges themselves will be parallel, because the distance of separation of the bending-lips 5 is constant. The advantage of this in the manufacture of roofing is very considerable, because, while it makes little difference within certain limits how much metal is in the locking-flanges of the sheets, yet if the width of the unbent parts of several sheets be irregular, or if the sides be not parallel after the bending process, the greatest difficulty will be experienced in locking the sheets together.

The difficulty in preserving uniformity in shape and size in the bent sheets arises, chiefly, from the fact that the tin sheets as they are supplied to the trade are not always of the same size, and with the machines heretofore in common use the greatest care had to be used to prevent this inequality from appearing in the bent sheets and spoiling their capacity for interlocking. With my machine, however, this evil is completely avoided and the sheets produced are of substantially the same size and shape.

As I have described it, my machine is capable of producing sheets of a single width; but as it is often desirable to adapt it to make them of different sizes to be used for different buildings, I have devised means for altering the width of the machine-bed and of the distance between the bending-lips 5. The side rails of the bed are connected by separate braces 15 and 16, which are fixed alternately to each rail, while each piece is loosely connected to its adjoining piece by tongues and mortises, so that the side rails may be moved toward and away from each other without disjoining the braces, Fig. 3. Right and left hand screw-shafts 17 connect the side rails, 3, and, by turning them in one direction or the other the bed is caused to contract or expand, as will be readily understood. The bending-frame 4 is similarly constructed, so as to be capable of being widened or narrowed, and as the shackles 18, by which the frame is hinged to the bed, are secured to the side rails of the latter, there is no difficulty in preserving the proper relative adjustment of the bed and the hinged frame, together with its lips 5. Of course, as these parts are contracted, the sheet when bent will be of correspondingly less width, and by enlarging them the sheets will be correspondingly widened.

I do not wish to limit myself to the use of the telescopic braces 15 and 16, as shown. Their function is simply to act as guides and braces to permit the easy adjustment of the parts, and may be substituted by connecting-rods or any other equivalent mechanism.

The advantages possessed by my machine are, among other things, the certainty and uniformity of its action, its simplicity and ease of operation, and the facility afforded for properly adjusting the sheets in it, whereby the speed of operation is greatly increased and a single operator enabled to produce many more completed roofing-sheets than has heretofore been practicable on any other machine known to me.

Some of the advantages of the bending of both sides of the sheet by a single movement of the hinged frame 4 have already been indicated. Besides these, however, it greatly reduces the time and labor by enabling that to be done at one operation which has heretofore required distinct steps.

I claim—

1. In a machine for preparing roofing-sheets, the combination of a bed, an oscillating lever or frame having bending-lips on both sides, and bending-levers 9, arranged to co-operate therewith, substantially as and for the purposes described.

2. In a machine for preparing roofing-sheets, the combination of a bed, an oscillating lever or frame having bending-lips on both sides, and mechanism, substantially as described, for widening and contracting the bed and the oscillating lever or frame, substantially as and for the purposes described.

3. In a machine for preparing roofing-sheets, the combination of a bed, an oscillating lever having a bending-lip, a bending-lever, 9, arranged to co-operate therewith, and a hinged lateral gage or stop-rail, substantially as and for the purposes described.

In testimony whereof I have hereunto set my hand this 16th day of January, A. D. 1886.

JAMES M. WHITLATCH.

Witnesses:
W. B. CORWIN,
THOMAS W. BAKEWELL.